(12) United States Patent
Amar et al.

(10) Patent No.: US 10,909,275 B2
(45) Date of Patent: *Feb. 2, 2021

(54) BREAST SHAPE AND UPPER TORSO ENHANCEMENT TOOL

(71) Applicant: LUVLYU, INC., North Potomac, MD (US)

(72) Inventors: Sharon Amar, North Potomac, MD (US); Kevin McNeely, Bethesda, MD (US)

(73) Assignee: LUVLYU, INC., North Potomac, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/205,520

(22) Filed: Nov. 30, 2018

(65) Prior Publication Data
US 2019/0171778 A1 Jun. 6, 2019

Related U.S. Application Data

(63) Continuation of application No. 15/082,314, filed on Mar. 28, 2016, and a continuation of application No. 15/082,489, filed on Mar. 28, 2016, now Pat. No. 10,176,275.

(51) Int. Cl.
*G06F 30/00* (2020.01)
*G05B 19/4099* (2006.01)
*B33Y 80/00* (2015.01)
*B33Y 10/00* (2015.01)
*B33Y 50/00* (2015.01)
*G06F 30/20* (2020.01)
*B29L 31/00* (2006.01)
*G06F 111/10* (2020.01)
*G06F 113/12* (2020.01)
*G06F 119/18* (2020.01)

(52) U.S. Cl.
CPC .............. *G06F 30/00* (2020.01); *B33Y 10/00* (2014.12); *B33Y 50/00* (2014.12); *B33Y 80/00* (2014.12); *G05B 19/4099* (2013.01); *G06F 30/20* (2020.01); *B29L 2031/7532* (2013.01); *G05B 2219/35134* (2013.01); *G05B 2219/49007* (2013.01); *G06F 2111/10* (2020.01); *G06F 2113/12* (2020.01); *G06F 2119/18* (2020.01)

(58) Field of Classification Search
CPC ......... G06F 30/00; G06F 30/20; B33Y 50/00; B33Y 10/00; G05B 19/4099
See application file for complete search history.

(56) References Cited

U.S. PATENT DOCUMENTS

| | | | |
|---|---|---|---|
| 6,564,086 B2 * | 5/2003 | Marchitto | A61B 5/0064 600/425 |
| 9,129,055 B2 * | 9/2015 | Mordaunt | G06T 19/20 |
| 10,176,275 B1 * | 1/2019 | Amar | G06F 30/20 |

(Continued)

*Primary Examiner* — Vincent H Tran
(74) *Attorney, Agent, or Firm* — Browdy and Neimark, P.L.L.C.

(57) ABSTRACT

A method of making a breast or chest mask that includes enhancing a bust size of a three dimensional (3D) image of a user that illustrates a current body shape, comparing the enhanced 3D image to the current body shape 3D image and subtracting the bust size of the enhanced 3D image from the current body shape 3D image to produce a breast mask product with dimensions based on the compared 3D images.

17 Claims, 14 Drawing Sheets

(56) References Cited

U.S. PATENT DOCUMENTS

| | | | |
|---|---|---|---|
| 2003/0208269 A1* | 11/2003 | Eaton | A61F 2/52 |
| | | | 623/7 |
| 2009/0137894 A1 | 5/2009 | Olson | |
| 2012/0236117 A1 | 9/2012 | Quadling | |
| 2014/0028799 A1 | 1/2014 | Kuffner et al. | |
| 2014/0125775 A1 | 5/2014 | Holz | |
| 2015/0228086 A1 | 8/2015 | Maurer et al. | |
| 2016/0005106 A1 | 1/2016 | Giraldez et al. | |
| 2016/0062152 A1 | 3/2016 | Fonte et al. | |
| 2016/0155247 A1* | 6/2016 | Robinson | A61B 8/4254 |
| | | | 382/131 |
| 2016/0284116 A1 | 9/2016 | Crain et al. | |
| 2016/0310064 A1 | 10/2016 | Cheng | |
| 2017/0046833 A1 | 2/2017 | Lurie et al. | |
| 2017/0111632 A1 | 4/2017 | Thirion | |
| 2017/0119471 A1* | 5/2017 | Winner | A61B 34/10 |
| 2017/0281367 A1* | 10/2017 | Ketchum | A61F 2/5046 |

\* cited by examiner

Before – Size A

After – Size B
Implant Size 220 cc

After – Size C
Implant Size 420 cc

BREAST SHAPE AND UPPER TORSO ENHANCEMENT TOOL

CROSS-REFERENCE TO RELATED APPLICATIONS

This utility patent application is a continuation of U.S. patent application Ser. Nos. 15/082,489 and 15/082,314 filed on Mar. 28, 2016, which are both incorporated by reference herein in their entirety.

TECHNICAL FIELD

The present invention relates generally to breast and upper torso or trunk enhancement for cosmetic and reconstructive surgery or other purposes. In particular, the present invention relates to improved modeling for the outcome of cosmetic and reconstructive surgery systems or for creating enhanced aesthetic appearances for other purposes.

BACKGROUND

Cosmetic or reconstructive surgery can come with significant uncertainties. For example, if a woman desires a breast augmentation, she may consult a cosmetic surgeon to view before and after photos and/or to get a feel for how large the implants will be. Based on this consultation, a woman may choose a new size and look. However, this may not provide a complete understanding of how the selected breast implants will actually look and feel. In some cases, women who are unhappy with the results of the procedure end up getting further revisions to change the size of the breast implant.

The system and apparatus of this invention allow a user to evaluate the results of various cosmetic and reconstructive surgical procedures by viewing and trying on a three-dimensional model of what the breast augmentation will look and feel like. As another feature, breast pads and/or breast and chest masks may be created for aesthetic purposes.

SUMMARY

The visualization and modeling systems utilizes a series of images to develop a three-dimensional image of an upper torso. Once the 3D model is completed, it can be manipulated to, for example, simulate a larger breast size or to increase the amount of lift. This result can be saved as a second 3D model. Comparison of the before and after 3D models yields a chest or breast mask product with dimensions and a volume as the difference in dimensions between the two models. With these measurements the chest or breast mask can be printed on a three-dimensional printer to produce as an actual mask with accurate dimensions for a specific user. The breast pad or mask can be worn over the breast to model a simulated result of cosmetic surgery. In another embodiment, the breast pad or mask can be worn inside a brassiere or can be worn instead of a brassiere for aesthetic purposes.

In one general aspect, a method of making a breast pad or mask, includes enhancing a bust size of a three dimensional (3D) image of a user that illustrates a current body shape, comparing an enhanced 3D image to the current body shape 3D image and subtracting the bust size of the enhanced 3D image from the current body shape 3D image to produce a 3D image of a breast pad or mask.

Embodiments may include one or more of the following features. For example, the method may include printing the 3D image of the breast pad or mask on a 3D printer. As another feature, the user may be prompted to take the current body shape 3D image. As another feature, the current body shape 3D image may be taken with a single mobile device that provides light from different angles of a display pad of the device.

The user may include an object of known size and color in the 3D image of the current body shape. Since the object has a known size, the algorithm can account for variations in how the camera is held and positioned to get a more accurate 3D breast volume image.

Since the object also has one or more known colors, it can be used for calibration purposes to get an accurate skin tone or color of the user's skin. Thus, a 3D image of the breast pad or mask may be printed with an accurate the skin color of the user.

In another general aspect, a method of making a mask that can be worn on a user's upper torso with an imaging device includes capturing more than one image of an upper torso of the user with the imaging device, detecting locations on the upper torso from the more than one image, producing a three dimensional (3D) upper torso image of the user from the detected locations, enhancing a bust size of the 3D upper torso to produce an enhanced 3D image, comparing the enhanced 3D image to the 3D upper torso image, producing a 3D image of the mask based on the comparison of the enhanced 3D image and the 3D upper torso image, wherein the mask includes the difference in volume between the 3D bust size image and the 3D upper torso image, and the mask includes a shape having an inner surface that conforms to the natural contours of the user's body and an outer surface of that conforms to the contours of the user's desired appearance, and producing the mask from the 3D image of the mask.

Embodiments may include one or more of the above or following features. For example, detecting locations on the upper torso includes identifying a location at a left side and a right side of a base of a neck of the user and further including calculating a distance between the left side and the right side of the base of the neck. An upper torso circumference may be derived by calculating the distance between the left side and the right side of the base of the neck and then multiplying by a numerical value of $\pi$ multiplied by the number 2.

As another feature, determining an upper torso circumference includes identifying a location at either side of a base of a neck of the user, identifying a location at a top of a sternum of the user, calculating a distance between one of the either side and the top of the sternum of the user, and calculating an upper torso circumference as the distance between one of the either side and the top of the sternum of the user) multiplied by the number 4.

As another embodiment, detecting locations on the upper torso of the user includes identifying a location at each side of a base of a neck of the user, and further including calculating a distance (D) between each side of the base of the neck of the user, and calculating an upper torso circumference from the formula: $(D*\pi/2)+2D$.

As another feature detecting locations on the upper torso includes identifying a location at each side of a base of a neck of the user, and further including determining a semi-circular distance between each side of a base of a neck location at each side of a base of a neck of the user, and calculating a semicircular distance between each side of the base of the neck of the user multiplied by the number 4.

Detecting locations on the upper torso may also include identifying a location on a breast of the user that is the closest point to the imaging device, and identifying a location immediately below the breast of the user that is on a vertical axis relative to the location of the closest point to the imaging device, and further including calculating a breast depth from the horizontal distance between the location immediately below the breast and the closest point to the imaging device.

Detecting locations on the upper torso from the more than one image can include identifying a position at each side of a base of a neck (1, 2) of the user, at each edge of a rib cage proximate to the bottom of each breast (11, 12) of the user, a position at which a bra strap goes over a shoulder (3, 5) of the user, a position of maximum curvature at a top of an intersection of an arm and a shoulder (9, 10) of the user, a position at a lowest point of each breast (7, 8) of the user, a position immediately above a sternum (17) of the user, a position at a top-center of each breast as the breast begins to arc away from the chest wall (4, 6) of the user, and a position at a top edge of a bra adjacent to the top, center of the breast as it begins to arc away from the chest wall (13, 14) of the user.

Detecting locations on the upper torso from the more than one image may further include identifying one or more cluster of pixels representing the upper torso, and further including counting the number of pixels in the captured more than one image, and calculating a distance between the image device and the user based on the number of pixels.

As another feature, actual dimensions may be based on reference to a calibration measurement. It may include identifying an object of known dimensions on the upper torso of the user and calibrating image dimensions based on the known dimensions of the object. The object may have a known color or colors and a comparison may be used to determine a skin tone of the user based on the comparison with the object. The mask may then be produced with the skin tone of the user.

As another feature, the mask may be produced with a 3D printer. The mask may be inserted in a bra-like device to be worn by the user. The mask can also be produced with tabs and/or slots and straps can be attached to the tabs and/or slots for the mask to be worn on the upper torso of the user.

As another feature each image of the upper torso of the user may be illuminated with different portions of the display screen to produce images with changes in light patterns, reflections and shadows. These differences are detected to assist in producing the 3D image of the upper torso.

In still another implementation, a device, includes a camera to capture a series of images of a trunk of a user, a display screen to illuminate the trunk of the user from different positions on the display screen for each of the series of images, a processor to produce a three-dimensional (3D) image of the trunk of the user based on the detected changes in light patterns, an input device to allow the user to enhance a bust size of the 3D image on the display screen to produce an enhanced 3D image on the display screen, and a comparison unit to compare the enhanced 3D image to the 3D image of the trunk of the user. The processor can produce a 3D image of a chest mask that can be worn over the chest of the user, wherein the chest mask includes differences in volume of the dimensions between the enhanced 3D image and 3D image of the trunk of the user, wherein the chest mask includes an inner surface that conforms to the natural contours of the user's body and an outer surface that conforms to the contours of the user's desired size and the chest mask can be produced with a 3D printer.

DETAILED DESCRIPTION

The described system and method can be used for brassiere measurement and/or to produce a three-dimensional chest or breast mask.

Figure 1:
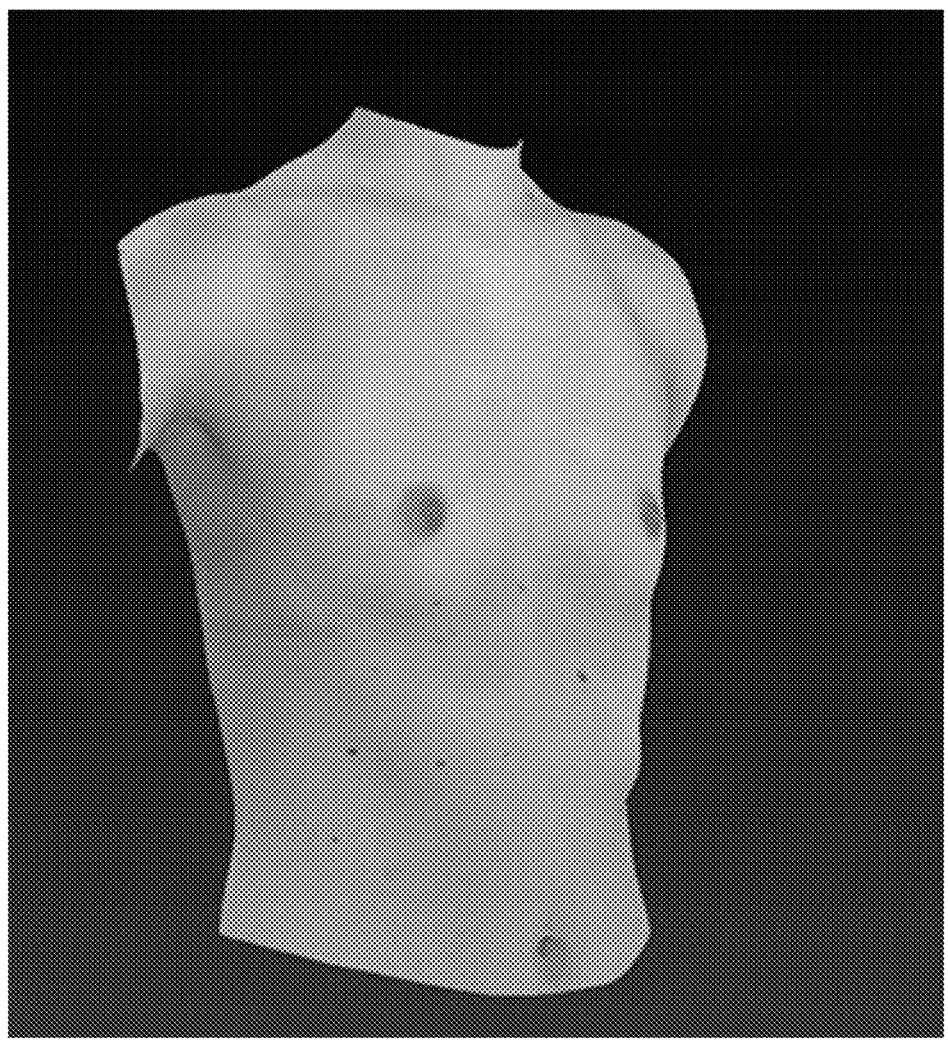
FIG. 1 is a 3D model of a user.

Referring to FIG. 1, a user can take a three-dimensional (3D) scan of a front portion of the torso. In one embodiment, a 3D scanner software application is downloaded to a portable electronic device, such as, for example, a tablet personal computer or a smartphone is used as a 3D scanner.

In one embodiment, the 3D scanner application takes a series of images with lighting provided from several different directions by the display panel of the portable device. In another embodiments, a camera flash or other source of light is used. For example, light can be projected from upper, lower, left and right quadrants of the display panel while capturing a series of four images. In either of these embodiments the user can be instructed to take the series of images in a darkened room.

In the example of FIG. 1, the user has a breast cup size A. In order to ensure privacy, the 3D image can be converted to a grid pattern and/or a series of measurements. The scanned image can be stored on the device or e-mailed to another device.

Figure 2:
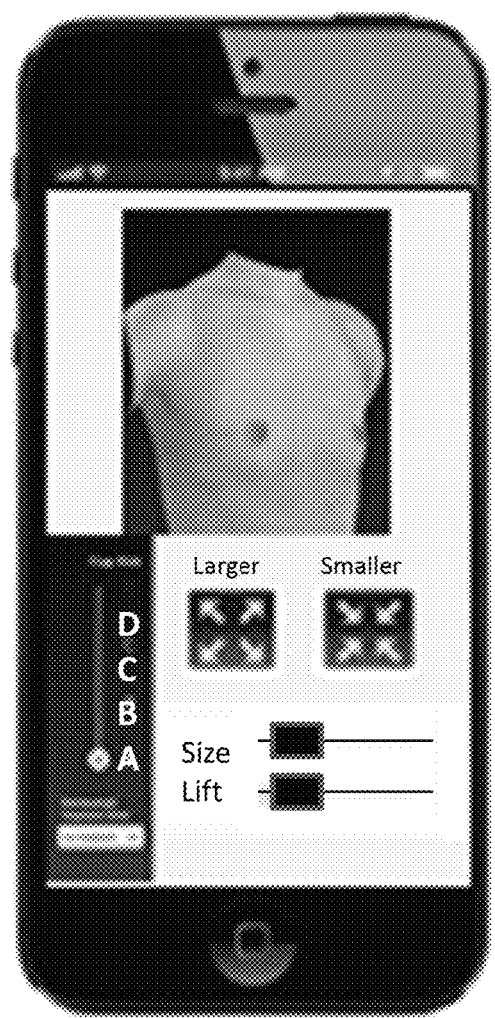
FIG. 2 shows an editor application on a mobile device.

Referring to FIG. 2, the user opens another software application and imports the 3D image into an editor of the application. The editor has a variety of tools available to alter breast appearance. For example, the user can slide a control from breast sizes A, B, C or D. The user can also define an area on the screen and use the larger or smaller buttons to increase or decrease the size of the defined area. As another editing feature, the user can separately adjust lift and size.

Figure 3:
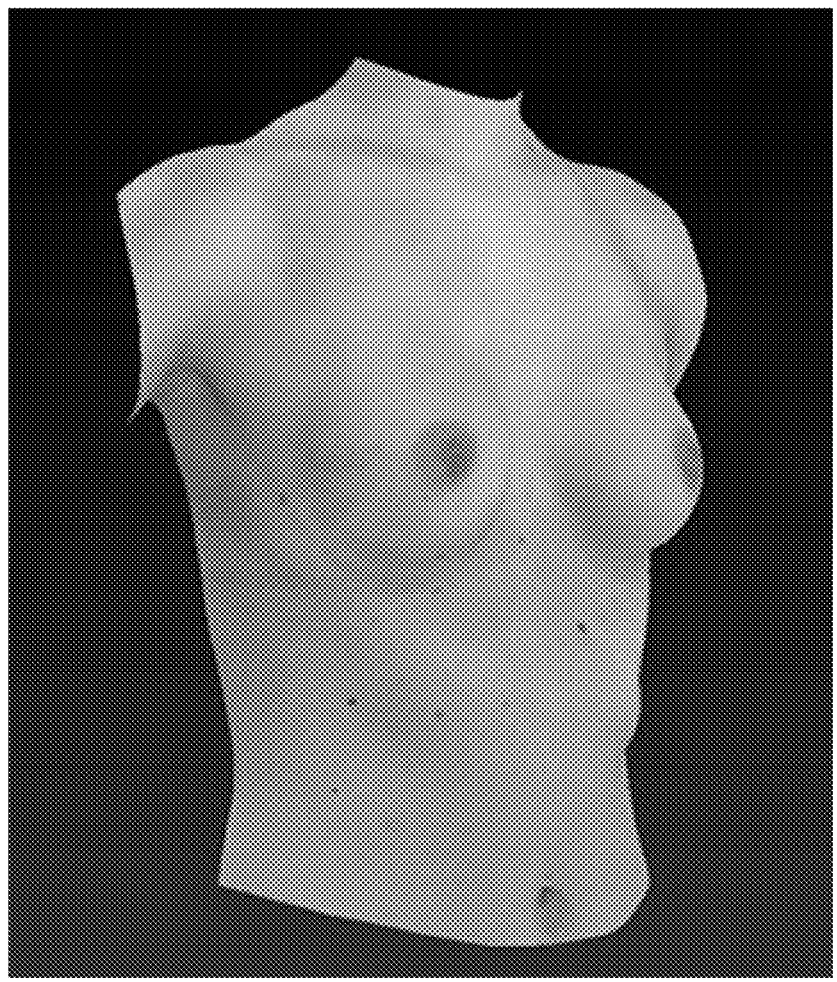
FIGS. 3 and 4 are three dimensional images of a user with enhanced breast sizes.
Figure 4:
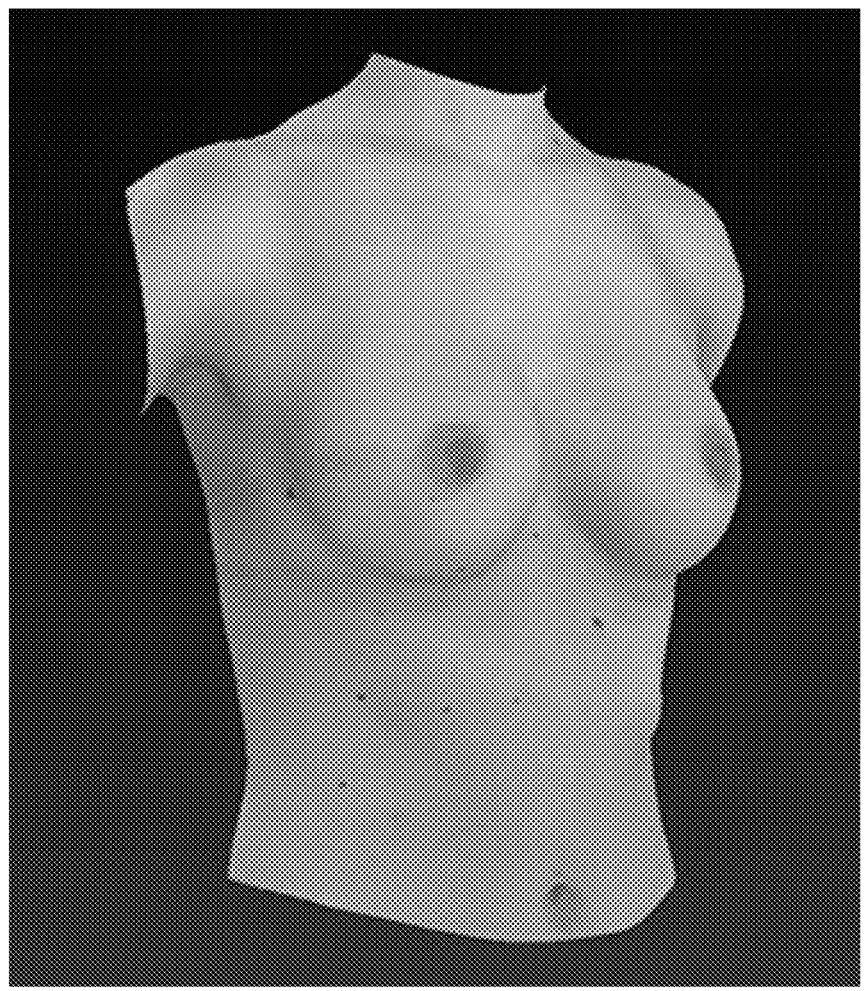

Referring to FIGS. 3 and 4, the user manipulates the editing controls to product 3d images with size B and C breasts, respectively. The application calculates the change in volume from the original image to be an addition of 220 and 420 cubic centimeters of volume, respectively.

At this point, the user has various virtual display options. For example, the user has tools to see what the image looks like in swimwear, a gown, a business suit or other clothing.

Figure 5A:
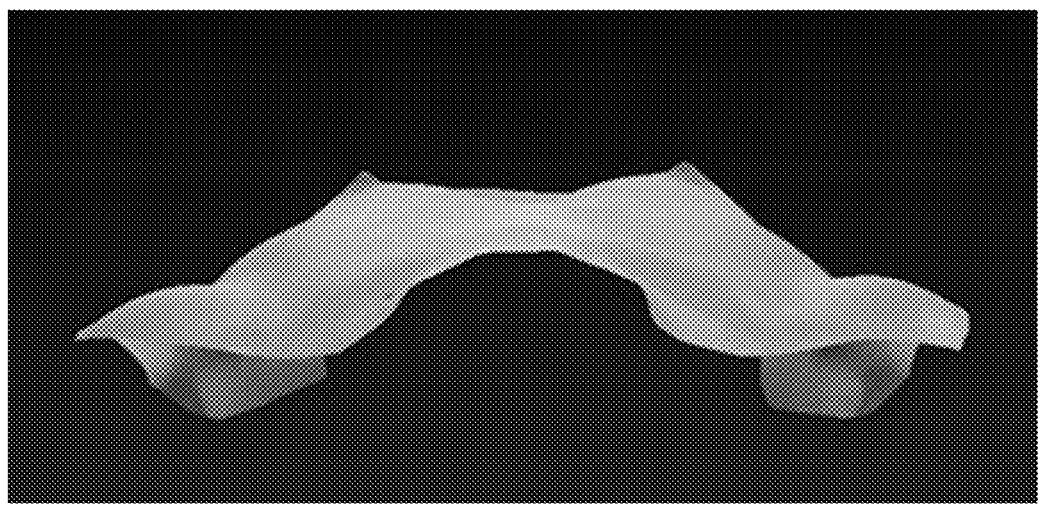
FIGS. 5A and 5B show original and enhanced 3D images.
Figure 5B:
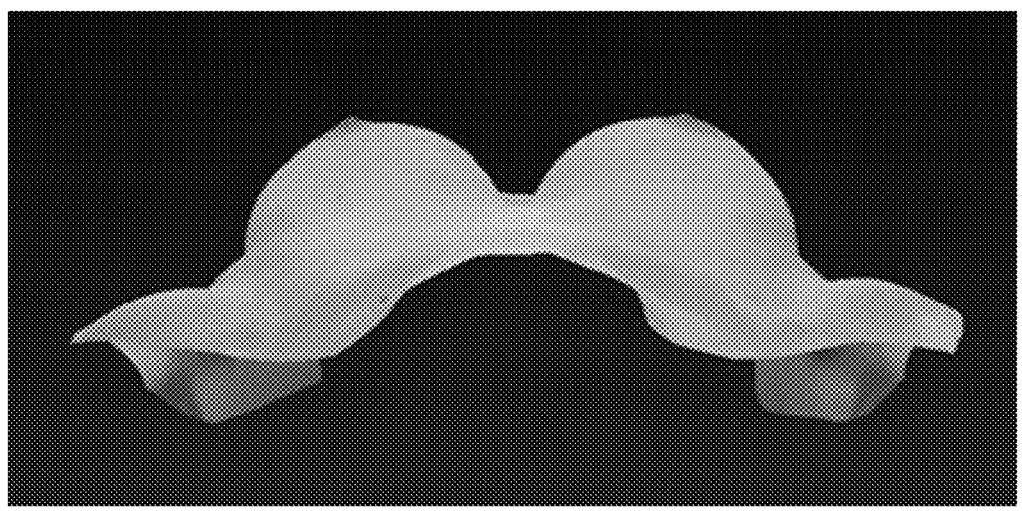

Referring to FIGS. 5A and 5B, the user selects one of the enhanced images for comparison to the original (before look). The image can be rotated for different views.

The user can export a stereo lithography (STL) file of the 3D image to a 3D printer. The image of the enhanced breast size can be printed and essentially worn as a mask to try on the new enhanced breast size.

Figure 6:
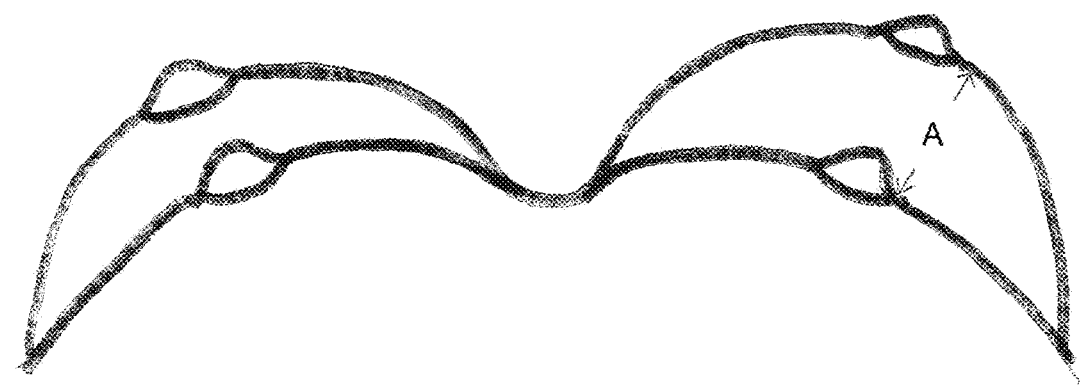
FIG. 6 shows sizes differences of the two busts.

Referring to FIG. 6, another alternative is to compare the volume of the original 3D scan and the enhanced 3D scan and subtract the dimensions of the two 3D models to produce a breast pad or mask with a volume and dimensions that fits the natural contours of the user's body but increases the bust to the desired size.

Figure 7A:
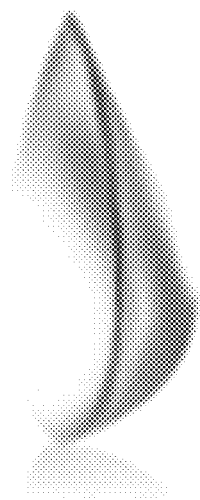
FIGS. 7A and 7B show breast masks or cups printed from a 3D printer.
Figure 7B:
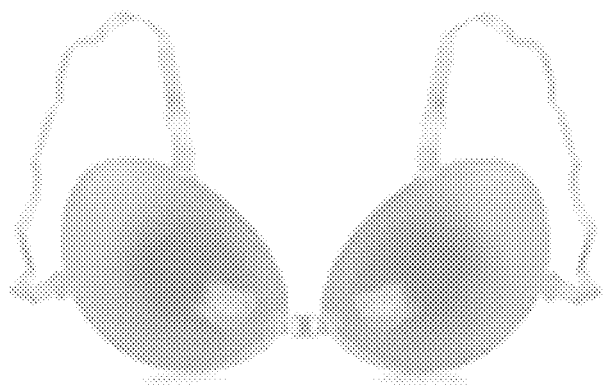

FIGS. 7A and 7B show two embodiments of the bust pads printed on a 3D printer. FIG. 7A shows an individual bust pad that can be worn over the user's breast. The breast pad or chest mask can also be designed so that it cannot be seen beneath a bra. Thus, the user can wear the breast pad or mask under various clothing. In another embodiment, the chest mask can be worn instead of a bra.

FIG. 7B shows the breast pad or mask worn as cups in a bra-like device that can be worn by the user. The 3D breast pad or mask can be printed with tabs or slot to attach the straps. In another embodiment, a brassiere with pockets is provided to insert the breast mask. The system also allows the user to have a customer brassiere made that includes breast masks. In this embodiment, the breast masks may be permanently installed in the customer brassiere.

Figure 8:
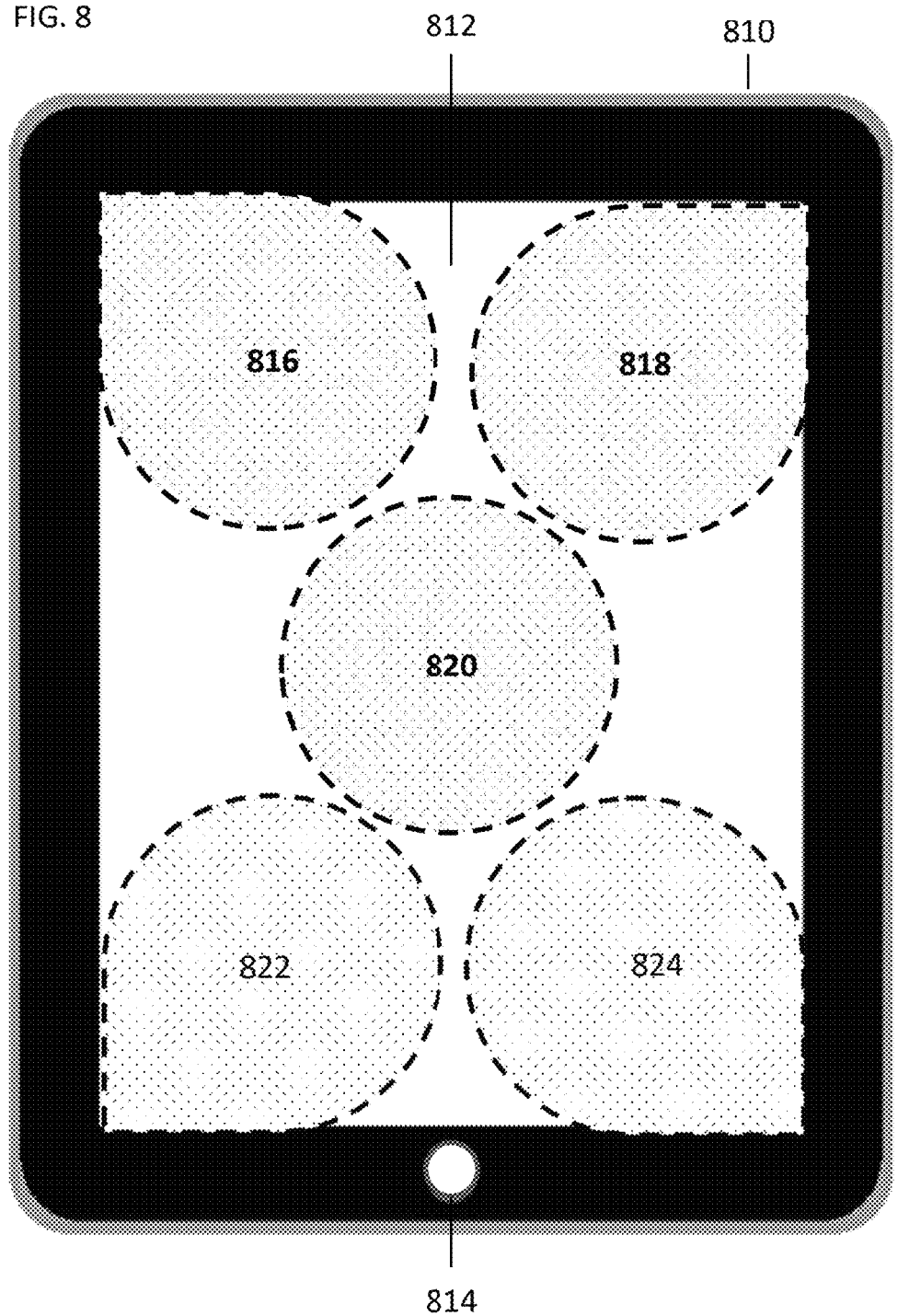
FIG. 8 shows a display screen of a mobile device.

Referring to FIG. 8, a mobile device 810 includes a display screen 812 and a camera lens 814. The mobile device 810 may also have a camera flash (not shown), however, this is only used when the flash is located on the same side of the device 810 as the display screen. Illumination from the display screen 812 can be provided from different positions, such as, for example, top left 816, top right 818, center 820, bottom left 822 and bottom right 824. A series of images can be taken by the camera 814 while the lighting position is varied on the display screen 812. The intensity of the lighting from the display screen can also be varied. In another embodiment, the light from the camera flash may also be used to vary the lighting level or position of the lighting emanating from the device 810.

The images can then be compared and the varied lighting from different angles and positions can be used to produce a three-dimensional image of the front half or a front portion of the object being photographed. In one embodiment, the images are taken in a darkened room or similar space so that the major source of light is from the cameral flash or display screen of the device.

The mobile device 812 may be, for example, a smart phone, a computer tablet, and/or any mobile computer device having a camera and a display screen. The mobile device may include, for example, random access memory, storage memory, a central processing unit, an operating system and software applications. The device 812 may be used with a SIM card for mobile communications and the device may also have WiFi, Bluetooth and other types of connectivity. The device 812 may also have a global positioning system, touch screen, display, keyboard, pen stylus, speakers, and a microphone.

Figure 9:
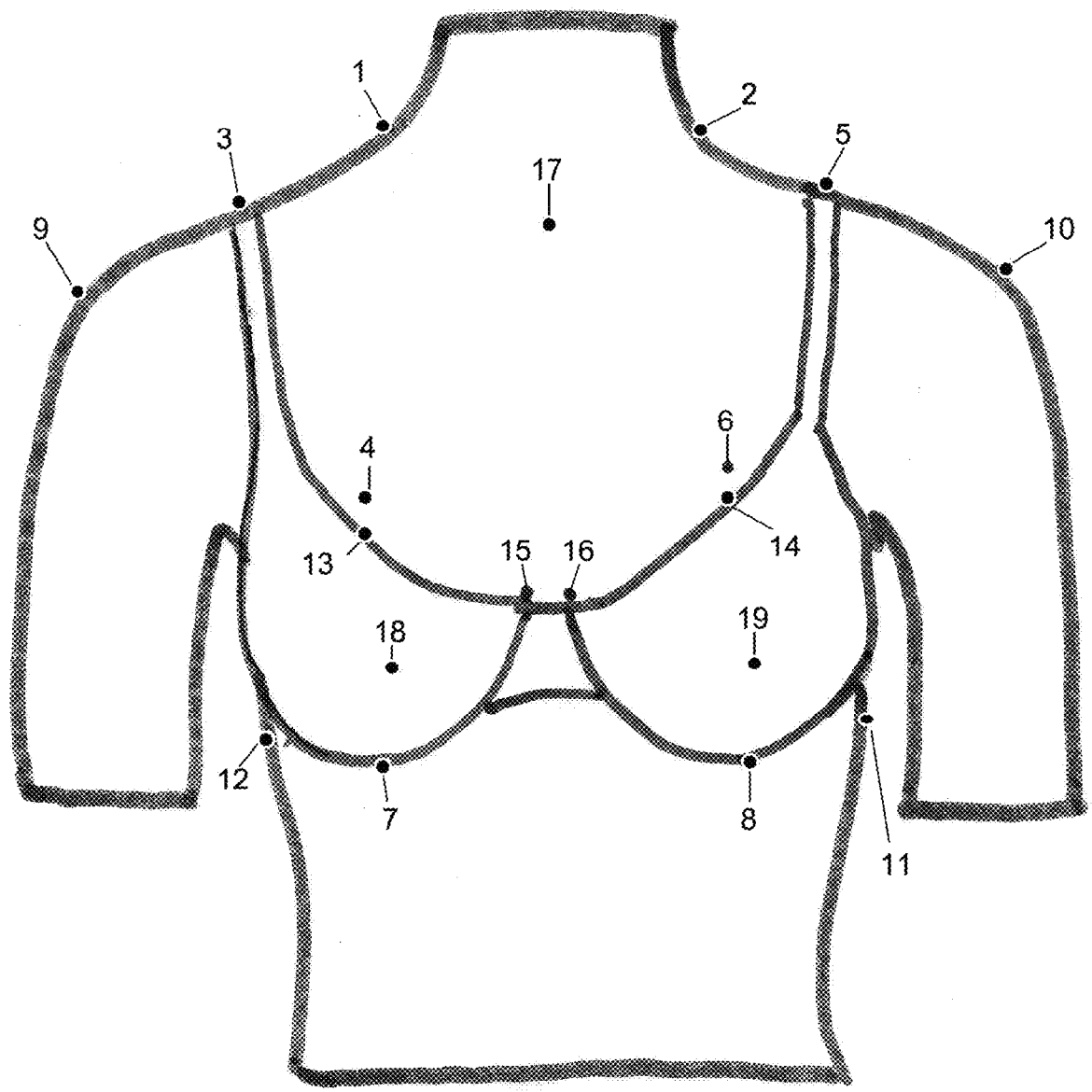
FIG. 9 shows a number diagram of positions on the trunk/chest.

Referring to FIG. 9, an image of the trunk/torso/chest of the user is shown with various numbered points that are detected and identified as follows:
1, 2 Base of neck on each side;
3, 5 Position where bra strap sits at top of shoulder;
4, 6 Center of each breast at top of breast as it begins to arc away from the chest wall;
7, 8 Bottom of each breast at lowest point;
9, 10 Position of top edge where shoulder and arm meet at maximum angle;
13, 14 Edge of bra at horizontal position at center of each breast at top of breast as it begins to arc away from the chest wall;
17 Center position of body immediately above top of sternum; and
8, 19 Closest positions to imaging device.

These numbered points can be used to determine various measurements:
1-17-2 Circumference around base of neck to the sternum
11-12 Measurement around rib cage, directly under the bust.
15-16 Horizontal distance between edge of breasts at position where breasts are closest.

Figure 10:
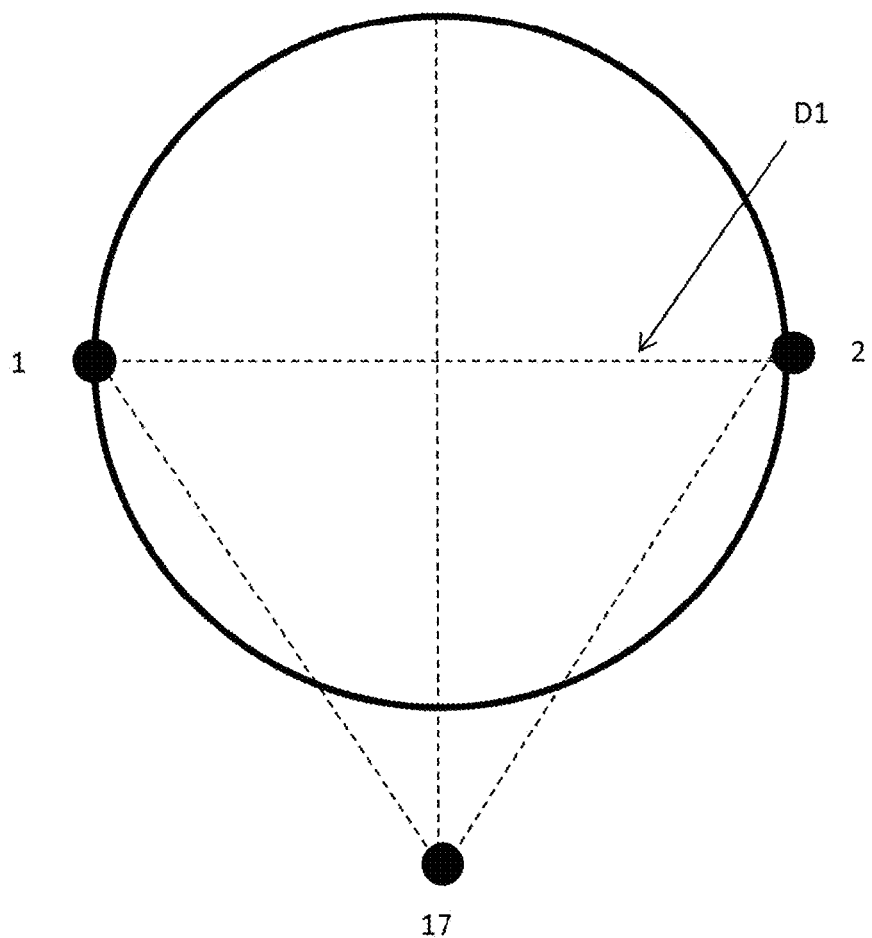
FIG. 10 shows a band measurement methodology.

FIG. 10 shows a methodology of calculating neck size and bra band size. In one embodiment, a linear measurement at the base of the neck from 1-2 measures the diameter of the neck (D1). The back half circumference of the neck is calculated as $D1*\pi/2$. The distance from each side of the neck to the top of the sternum is assumed to be an equilateral triangle or equal to D1. Based on typical proportions, the band size is then calculated as follows:

$$\text{Band size}=(D1+D1+(D1\times\pi/2))\times2$$

The band size is then rounded up to the nearest size. For example, assume D1 is 5.25", then the band size is calculated as 37.49" based on the following:

$$(5.25+5.25+(5.25\times\pi/2))\times2=37.49$$

This calculation is then rounded up to the next standardized band size of 38".

Figure 11A:
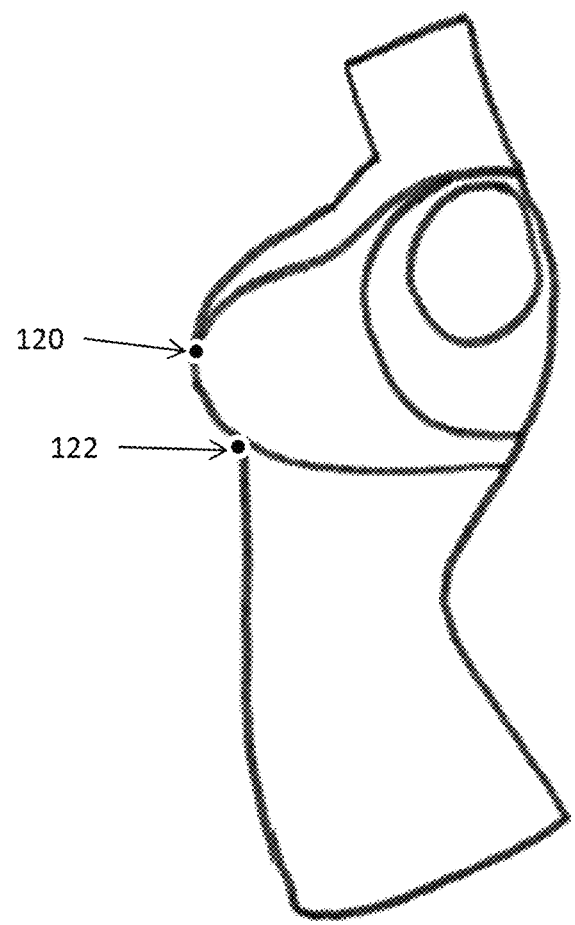
FIGS. 11A and 11B shows a cup measurement methodology.
Figure 11B:
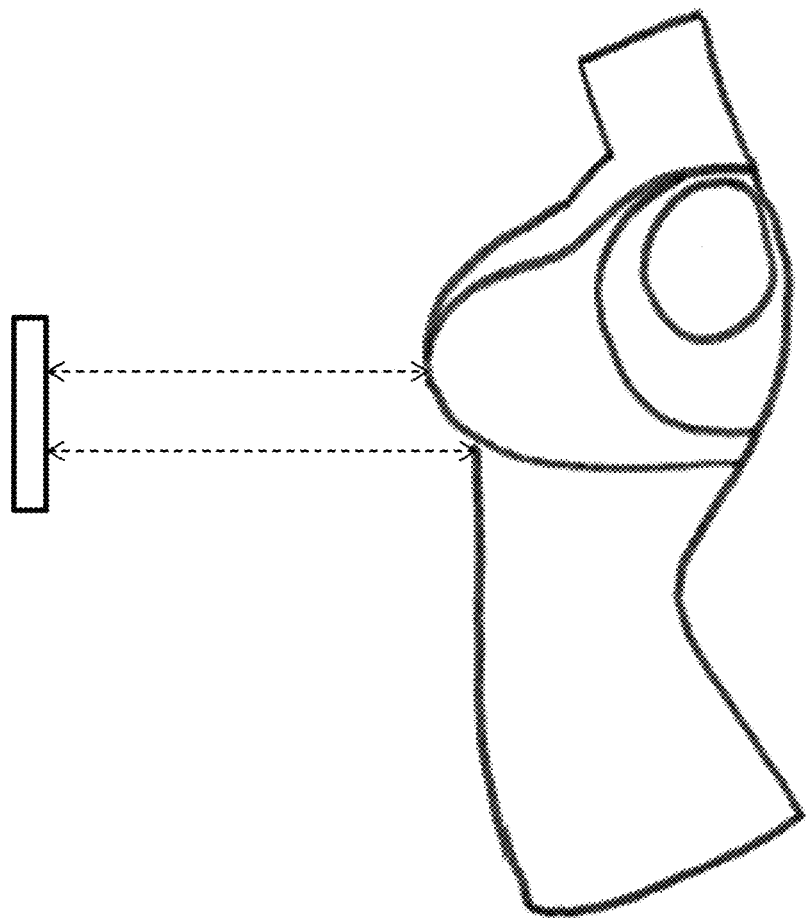

FIGS. 11a and 11b show a method of determining cup size of a woman's breast. The device measures the distance from the closest point (CP) 120 on the bra of the subject. The device then finds the lowest point (LP) 122 on the bra that is vertically below the CP 120. The horizontal distance between CP and LP is then calculated to determine a breast depth. The breast depth is then used in conjunction with the band size to determine the cup size.

For each inch of projection of the breast there is a commensurate increase in cup size. That is because cup size is a measure of depth and not a measure of volume. For example, a 30 inch band size and one inch of projection results in a cup size of A. For each additional inch of depth, the cup size increases to B, C, D, E (DD), F (DDD), G, H, I, J, K, L, respectively. The same relationship holds true for other band sizes. However, as the band size increases to, for example, 32, 34 and 36 inches, the cup size is reduced by one letter to maintain the same volume.

In one embodiment, the application has an algorithm with a Bayes classifier that classifies image pixels on the trunk/torso of the user into skin pixels and non-skin pixels. Thus, the outline of the bra can be identified and the measurements can be obtained.

Figure 12:
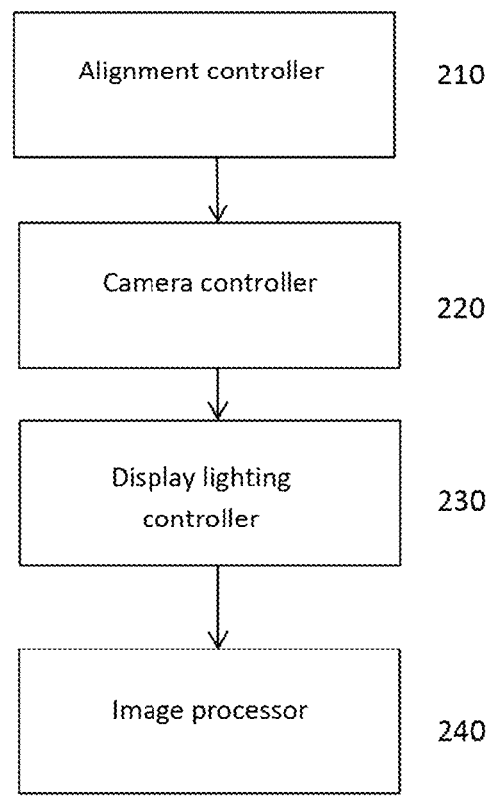
FIGS. 12-13 show a block diagram of a measurement apparatus.

FIG. 12 is a block diagram of a system controller of a brassiere measurement apparatus. The system controller includes an alignment controller 210, a camera controller 220, a display lighting controller 230 and an image processor 240. The alignment controller 210 can be used to respond to the user adjustments to adjust the positions of the markers on the display screen. The camera controller 220 automatically controls focus and other image parameters.

In one embodiment, a series of images may be taken at different focus depths. A mathematical algorithm can be used to calculate the angle at which the light is striking each pixel by comparing slight differences between the images taken from the same position but focused at different depths.

The image processor 240 can then combine the images to produce a three-dimensional image.

In another embodiment, the display lighting controller 230 projects light from the display screen of the mobile device from different portions of the display screen. For example, the display screen may be illuminated in separate quadrants to produce multiple images with lighting from different angles. The algorithm uses the illumination from different positions or angles to detect patterns of light reflected off of an object to build a three dimensional model of the portions of the object that are visible to the camera. This technique may be used in conjunction with very low levels of background lighting in order to utilize only the light from the display for imaging purposes.

By using changing focus depths and/or changes in directions of illumination, the mobile device may be held in a stationary position and still be able to produce a three dimensional image. For example, the user can hold the camera (mobile device) at arms-length from one position to produce a three-dimensional image of the user's upper trunk/torso.

Figure 13:
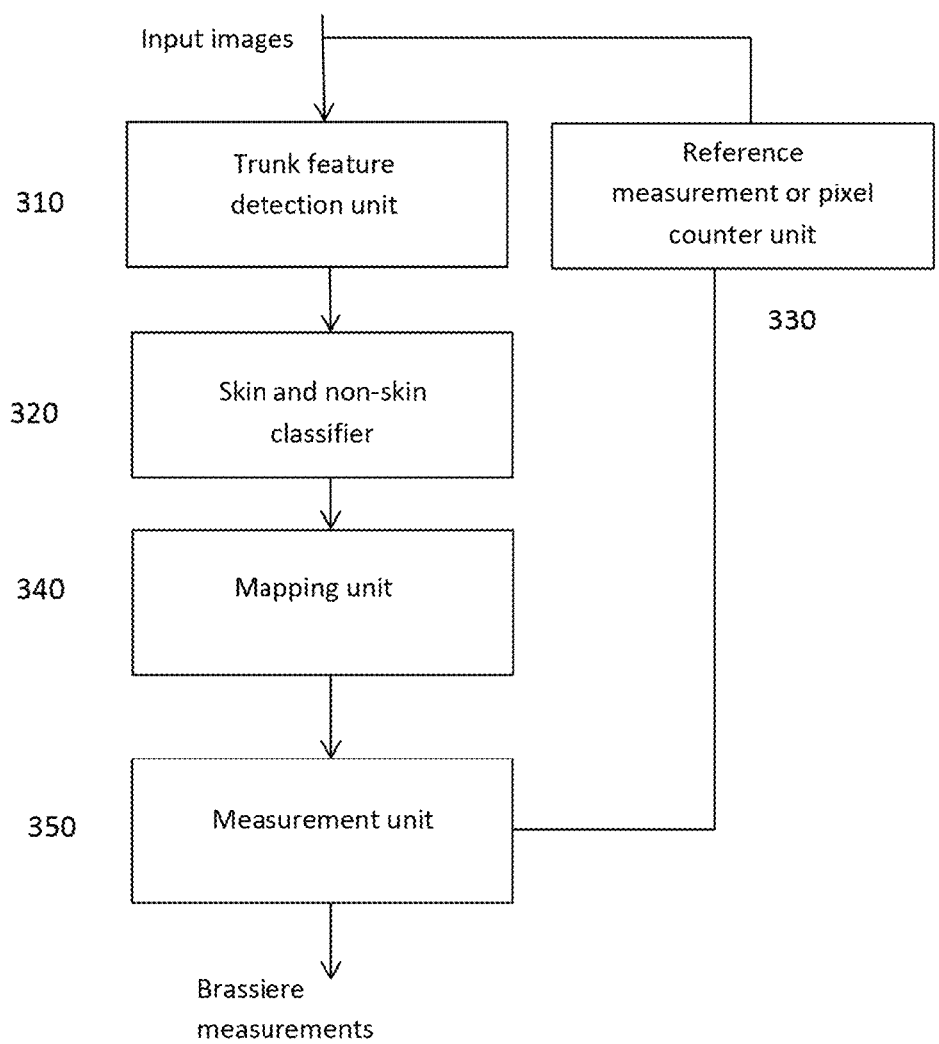

FIG. 13 is a block diagram of an image processor of a measurement apparatus for brassieres or breast masks. The apparatus includes a trunk feature detection unit 310, a skin and non-skin classifier 320, a pixel counter 330, a mapping unit 340 and a measurement unit 350. The reference measurement or pixel counter unit is used for calibration of dimensions of an object in the field of view based on comparison to the reference.

The trunk feature detection unit 310 determines the portions of the object in the field of view that comprises the trunk of a user. The skin and non-skin classifier 320 determines what portion of the trunk is skin and what portion may be clothing. For example, a user can take an imager of her trunk while wearing a bra and the classifier 320 determines the outline of the bra and the outline of the user's body. The measurement unit 350 processes the image in comparison to the dimensions from the reference unit to produce a three-dimensional image with accurate dimensions that include length, width and depth as well as volume.

The apparatus can be provided on a mobile device, such as, a handheld computing device, having a display screen with touch input and/or a miniature keyboard. The handheld computing device has an operating system, and can run various types of application software, known as apps. The device can also be equipped with Wi-Fi, Bluetooth, and GPS capabilities that can allow connections to the Internet and other Bluetooth-capable devices. A camera can also be used on the device which should have a stable battery power source such as a lithium battery.

The above description of various embodiments reveals the general nature of the invention so that others can readily modify and/or adapt for various applications other embodiments without departing from the concept, and, therefore, such adaptations and modifications are within the scope of the claims and equivalents. The terminology used herein is for the purpose of description and not of limitation. The means, materials, and steps for carrying out various disclosed functions may take a variety of alternative forms without departing from the invention.

The invention claimed is:

1. A method of making a mask that can be worn on a user's upper torso with an imaging device, the method comprising:
    capturing more than one image of an upper torso of the user with the imaging device;
    detecting locations on the upper torso from the more than one image that include a location at a left side and a right side of a base of a neck of the user;
    calculating a distance between the left side and the right side of the base of the neck;
    calculating an upper torso circumference from the product of the distance between the left side and the right side of the base of the neck, the numerical value of $\pi$ multiplied and the number 2 expressed as $$\text{upper torso circumference} = (\text{distance between left and right side of the base of the neck}) * \pi * 2;$$

producing a three dimensional (3D) upper torso image of the user from the detected locations and calculated measurements;
    enhancing a bust size of the 3D upper torso to produce an enhanced 3D image;
    comparing the enhanced 3D image to the 3D upper torso image;
    producing a 3D image of the mask based on the comparison of the enhanced 3D image and the 3D upper torso image, wherein
        the mask comprises the difference in volume between the 3D bust size image and the 3D upper torso image; and
        the mask comprises a shape having an inner surface that conforms to the natural contours of the user's body and an outer surface of that conforms to the contours of the user's desired appearance; and
    producing the mask from the 3D image of the mask.

2. The method of claim 1, wherein detecting locations on the upper torso comprises identifying a location at each side of a base of a neck of the user; and
    further comprising
    determining a semicircular distance between each side of a base of a neck location at each side of a base of a neck of the user; and
    calculating a semicircular distance between each side of the base of the neck of the user multiplied by the number 4.

3. The method of claim 1, wherein detecting locations on the upper torso comprises:
    identifying a location on a breast of the user that is the closest point to the imaging device; and
    identifying a location immediately below the breast of the user that is on a vertical axis relative to the location of the closest point to the imaging device; and
    further comprising calculating a breast depth from the horizontal distance between the location immediately below the breast and the closest point to the imaging device.

4. The method of claim 1, wherein detecting locations on the upper torso from the more than one image comprises identifying a position:
    at each side of a base of a neck (1, 2) of the user;
    at each edge of a rib cage proximate to the bottom of each breast (11, 12) of the user;
    a position at which a bra strap goes over a shoulder (3, 5) of the user;
    a position of maximum curvature at a top of an intersection of an arm and a shoulder (9, 10) of the user;
    a position at a lowest point of each breast (7, 8) of the user;
    a position immediately above a sternum (17) of the user;
    a position at a top-center of each breast as the breast begins to arc away from the chest wall (4, 6) of the user; and a position at a top edge of a bra adjacent to the top, center of the breast as it begins to arc away from the chest wall (13, 14) of the user.

5. The method of claim 1, wherein detecting locations on the upper torso from the more than one image comprises identifying one or more cluster of pixels representing the upper torso; and further comprising:
counting the number of pixels in the captured more than one image; and
calculating a distance between the image device and the user based on the number of pixels.

6. The method of claim 1, further comprising:
identifying an object of known dimensions on the upper torso of the user; and
calibrating image dimensions based on the known dimensions of the object.

7. The method of claim 1, further comprising prompting the user to hold the mobile device at a fixed position when the user takes the more than one image.

8. The method of claim 1, further comprising:
calculating actual dimensions of the 3D upper torso image with calibration based on an object of the known size.

9. The method of claim 1, further comprising:
producing the 3D upper torso image with actual dimensions based on reference to a calibration measurement.

10. The method of claim 1, further comprising:
including an object having a known color in the more than one image;
comparing the color of the object to the 3D upper torso; and
determining a skin tone of the 3D upper torso based on the comparison with the object.

11. The method of claim 10, wherein the object having a known color includes more than one color.

12. The method of claim 1, further comprising:
determining the skin tone of the upper torso of the user; and
producing the mask with the skin tone of the upper torso of the user.

13. The method of claim 1, wherein producing the mask comprises printing the mask with a 3D printer.

14. The method of claim 1, further comprising:
inserting the mask in a bra-like device to be worn by the user.

15. The method of claim 1, wherein producing the mask further comprises producing the mask with tabs and/or slots, and further comprising:
attaching straps to the tabs and/or slots for the mask to be worn on the upper torso of the user.

16. A device, comprising:
a camera to capture a series of images of a trunk of a user;
a display screen or camera flash unit to illuminate the user during capture of the series of images;
a detector to identify a location at either side of a base of a neck of the user and a location at a top of a sternum of the user; and
a processor to calculate a distance between one of either side and the top of the sternum of the user and to produce a three-dimensional (3D) image of the trunk of the user based on the captured series of images and the calculated distances;
an input device to allow the user to enhance a bust size of the 3D image on the display screen to produce an enhanced 3D image on the display screen; and
a comparison unit to compare the enhanced 3D image to the 3D image of the trunk of the user;
wherein
the processor produces a 3D image of a chest mask that can be worn over the chest of the user, wherein the chest mask comprises differences in volume of the dimensions between the enhanced 3D image and the 3D image of the trunk of the user, wherein the chest mask comprises an inner surface that conforms to the natural contours of the user's body and an outer surface that conforms to the contours of the user's desired size; and
producing the chest mask with a 3D printer.

17. A method of making a mask that can be worn on a user's upper torso, the method comprising:
capturing more than one image of an upper torso of the user;
detecting locations on the upper torso from the more than one image that include each side of a base of a neck, each edge of a rib cage proximate to the bottom of each breast, a position at which a bra strap goes over a shoulder of the user and a position at a lowest point of each breast;
producing a three dimensional (3D) upper torso image of the user from the captured images and detected locations;
enhancing a bust size of the 3D upper torso to produce an enhanced 3D image;
comparing the enhanced 3D image to the 3D upper torso image;
producing a 3D image of the mask based on the comparison of the enhanced 3D image and the 3D upper torso image, wherein
the mask comprises the difference in volume between the 3D bust size image and the 3D upper torso image; and
the mask comprises a shape having an inner surface that conforms to the natural contours of the user's body and an outer surface of that conforms to the contours of the user's desired appearance; and
producing the mask from the 3D image of the mask.

* * * * *